(12) United States Patent
Westmeyer et al.

(10) Patent No.: US 10,088,263 B2
(45) Date of Patent: Oct. 2, 2018

(54) ACCELERATION AND PRECISION CONTROLLED EJECTION OF MASS

(71) Applicants: Paul Westmeyer, Woodbridge, VA (US); Robert Edwin Woods, III, Stafford, VA (US); Robert Parker Woods, Stafford, VA (US)

(72) Inventors: Paul Westmeyer, Woodbridge, VA (US); Robert Edwin Woods, III, Stafford, VA (US); Robert Parker Woods, Stafford, VA (US)

(73) Assignee: Paul Westmeyer, Lancaster, PA (US)

( * ) Notice: Subject to any disclaimer, the term of this patent is extended or adjusted under 35 U.S.C. 154(b) by 0 days.

(21) Appl. No.: 15/430,663

(22) Filed: Feb. 13, 2017

(65) Prior Publication Data
US 2017/0232578 A1 Aug. 17, 2017

Related U.S. Application Data

(60) Provisional application No. 62/295,129, filed on Feb. 14, 2016.

(51) Int. Cl.
*F41B 3/04* (2006.01)
*B24C 5/06* (2006.01)
(Continued)

(52) U.S. Cl.
CPC ............... *F41B 3/04* (2013.01); *B24C 5/068* (2013.01); *G01F 1/76* (2013.01); *H02K 7/1004* (2013.01); *H02K 7/116* (2013.01)

(58) Field of Classification Search
CPC .................................. F41B 3/04; A63B 69/40
(Continued)

(56) References Cited

U.S. PATENT DOCUMENTS

| 1,408,137 A | * | 2/1922 | Parsons | F41B 3/04 124/6 |
| 2,684,062 A | * | 7/1954 | Rose | A62C 99/009 124/6 |

(Continued)

FOREIGN PATENT DOCUMENTS

| CN | 1566895 | 1/2005 |
| GB | 100791 | 6/1916 |

OTHER PUBLICATIONS

International Search Report, dated Apr. 28, 2017.

*Primary Examiner* — Alexander Niconovich
(74) *Attorney, Agent, or Firm* — Schaffer, Schaub & Marriott, Ltd.

(57) ABSTRACT

Rotational motion generates velocity of a mass wherein the mass' release from the rotating system, becoming a projectile, and subsequent impact can result in cutting, abrasion, mixing of chemicals, coating, and other surface and bulk volume effects including the transfer of momentum. Structures and devices are used to insert a mass into a rotating device. While inside the rotating device the mass gains velocity. Transitioning from the rotational system to a stationary surface is accomplished with a minimum of velocity loss by selecting trajectories, air flows, and surface finishes to reduce energy losses in the mass' transition onto the stationary surface and info a fixed stationary guide tube, and ultimately to an impact point. Single and multiple conduits, stationary and rotating, can be used to accomplish complex chemistry and physics affects.

38 Claims, 13 Drawing Sheets

Spinning Tube & Spinning Insertion Tube

(51) Int. Cl.
*G01F 1/76* (2006.01)
*H02K 7/10* (2006.01)
*H02K 7/116* (2006.01)

(58) Field of Classification Search
USPC .......................................................... 124/4, 6
See application file for complete search history.

(56) References Cited

U.S. PATENT DOCUMENTS

| | | | | |
|---|---|---|---|---|
| 3,015,991 A * | 1/1962 | Forbes, Jr. | .............. | F41F 3/048 |
| | | | | 102/377 |
| 3,613,655 A * | 10/1971 | Tobin | ........................ | F41B 3/04 |
| | | | | 124/50 |
| 3,822,688 A * | 7/1974 | Mayne | ................ | A63B 69/0026 |
| | | | | 124/42 |
| 4,607,605 A * | 8/1986 | Rutten | ...................... | F41B 3/04 |
| | | | | 124/6 |
| 4,632,086 A * | 12/1986 | Rutten | ...................... | F41B 3/04 |
| | | | | 124/6 |
| 5,813,391 A * | 9/1998 | Johnson | ................. | A63B 69/40 |
| | | | | 124/6 |
| 5,819,715 A * | 10/1998 | Haneda | ..................... | F41B 3/00 |
| | | | | 124/6 |
| 6,520,169 B1 * | 2/2003 | St. George | ................ | F41B 3/04 |
| | | | | 124/6 |
| 6,712,055 B1 * | 3/2004 | Tidman | ..................... | F41B 3/04 |
| | | | | 124/1 |
| 7,950,379 B2 * | 5/2011 | Tidman | ..................... | F41B 3/04 |
| | | | | 124/1 |
| 9,746,274 B1 * | 8/2017 | Bhattacharya | ............ | F41B 3/04 |
| 2005/0249576 A1 * | 11/2005 | Westmeyer | ............... | E21B 7/00 |
| | | | | 414/1 |

* cited by examiner

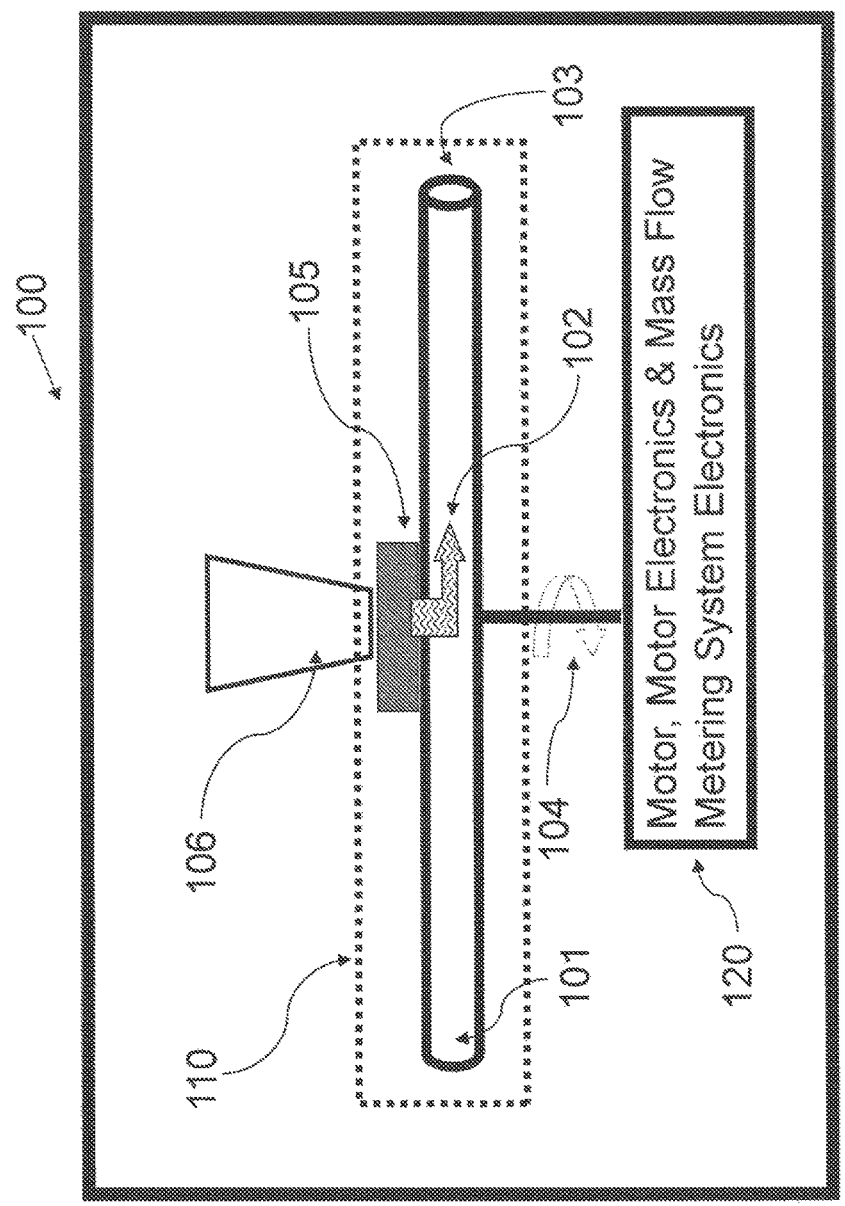
Fig. 1 Spinning Tube & Spinning Insertion Tube

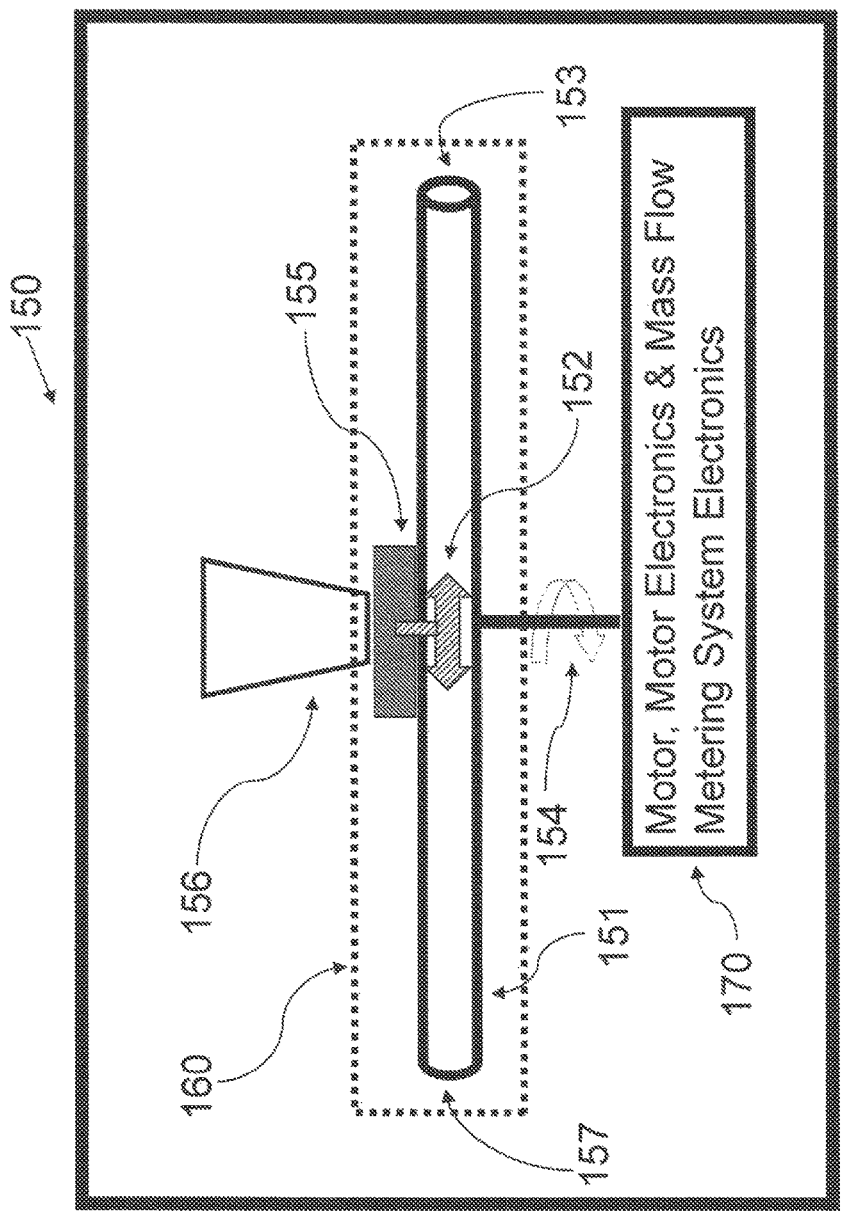
Fig. 1B Spinning Tubes & Dual-ported Spinning Insertion Tube

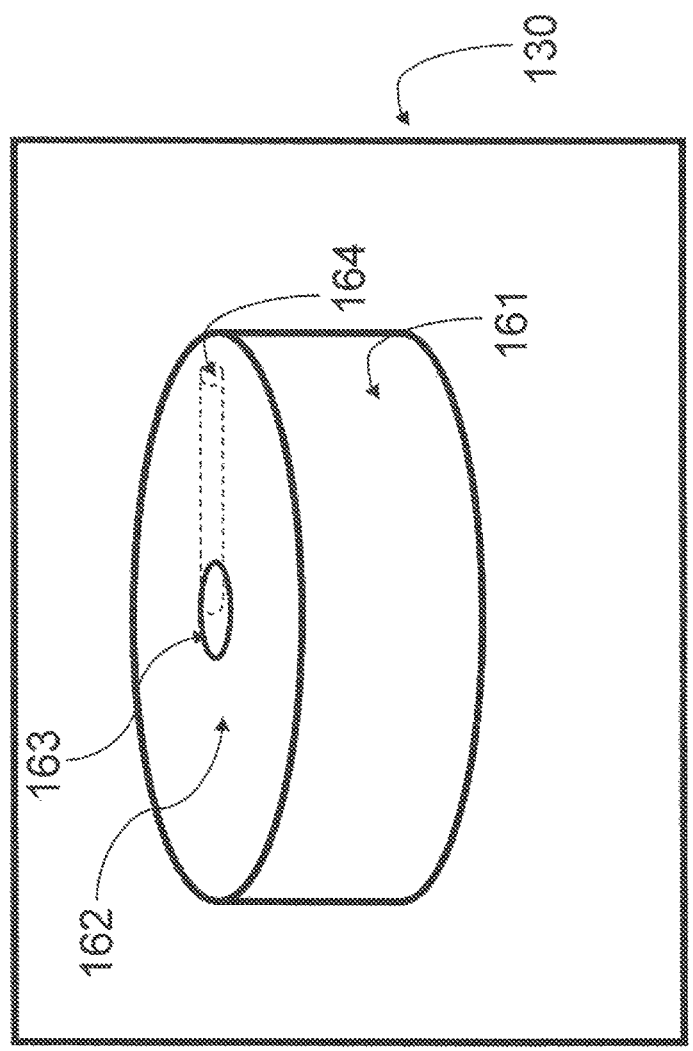
Figure 1C Fixed Structure

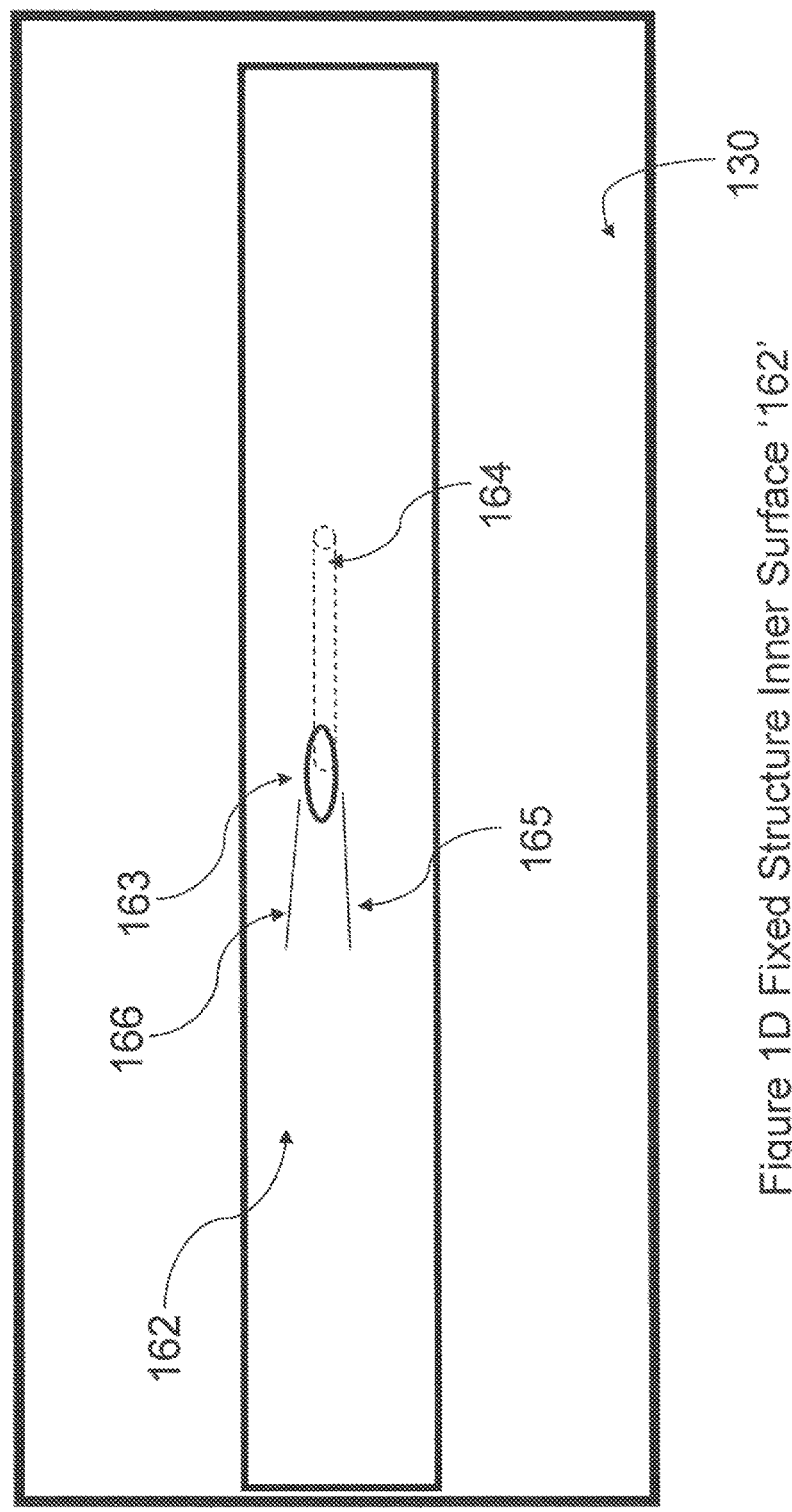
Figure 1D Fixed Structure Inner Surface '162'

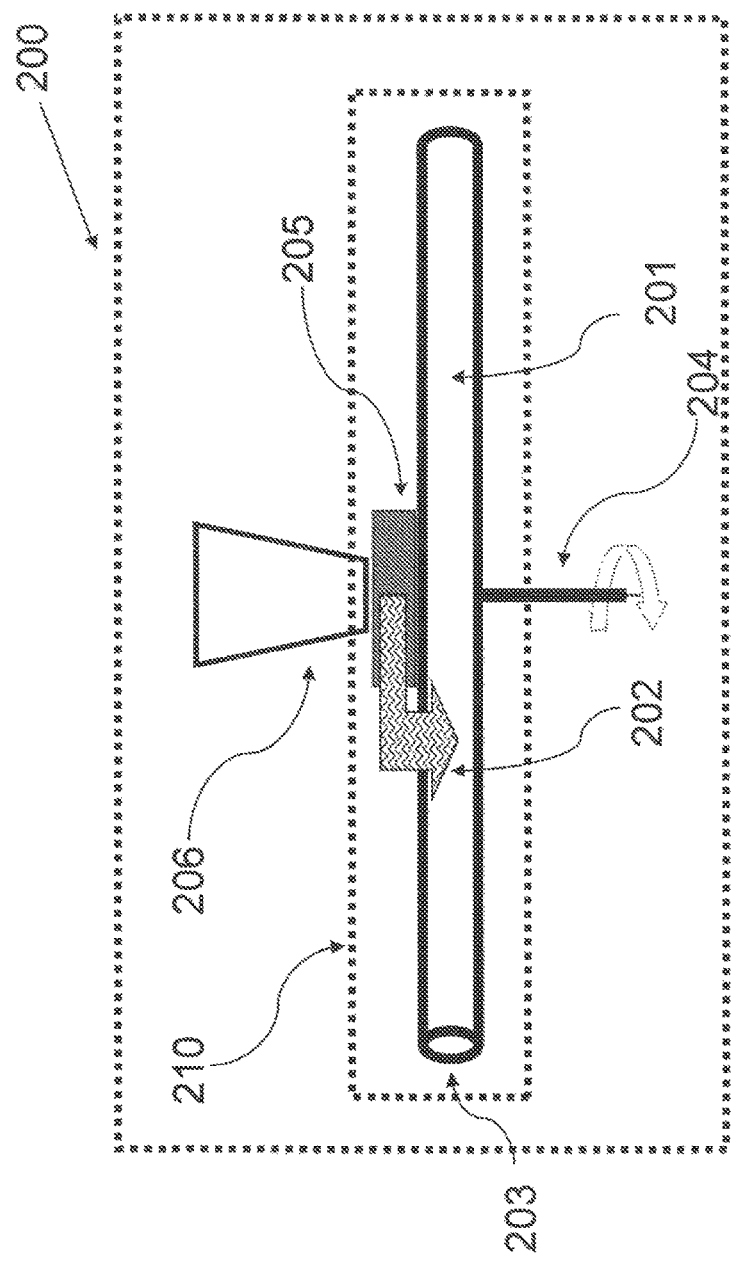
Fig. 2 Spinning Tube & Non-Spinning Insertion Tube (Side View)

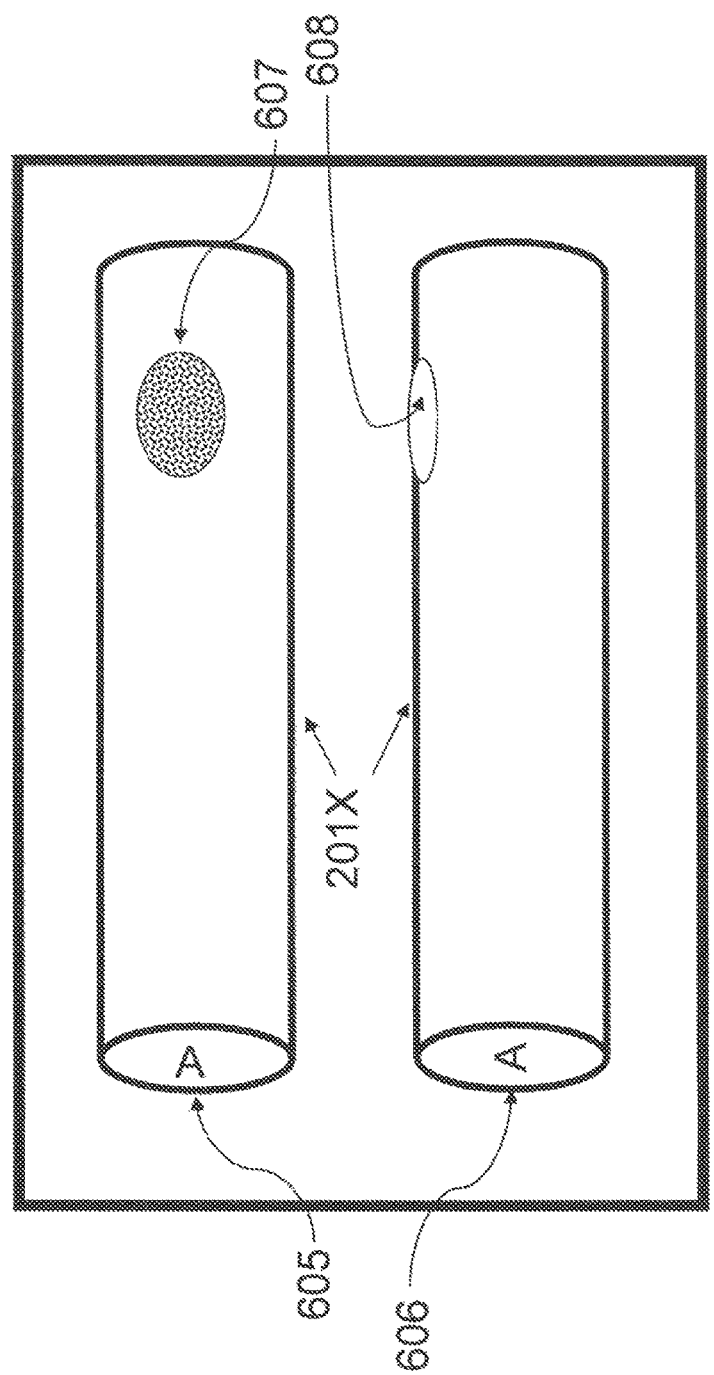
Fig. 2B Two-views, Spinning Tube '201' -- Indexed

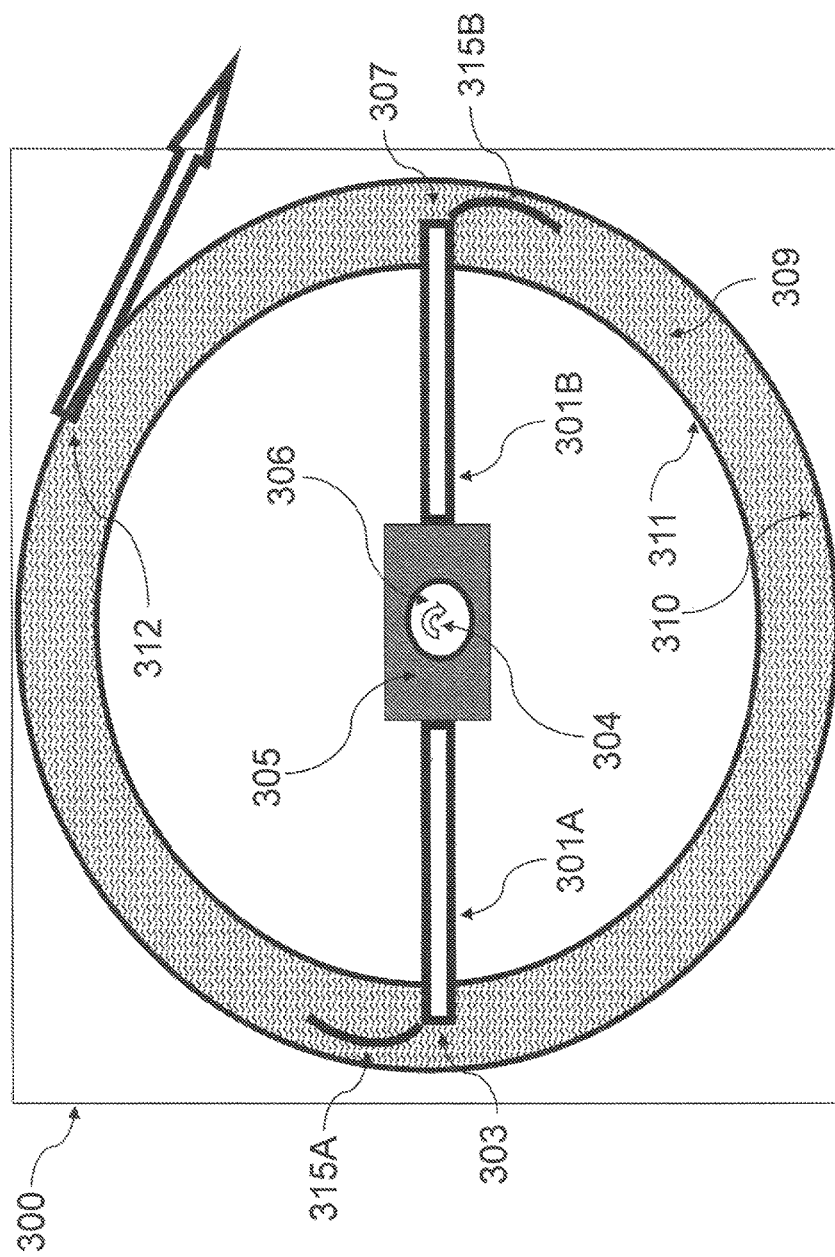
Fig. 3 Spinning Tube with Feed & Storage (Top View)

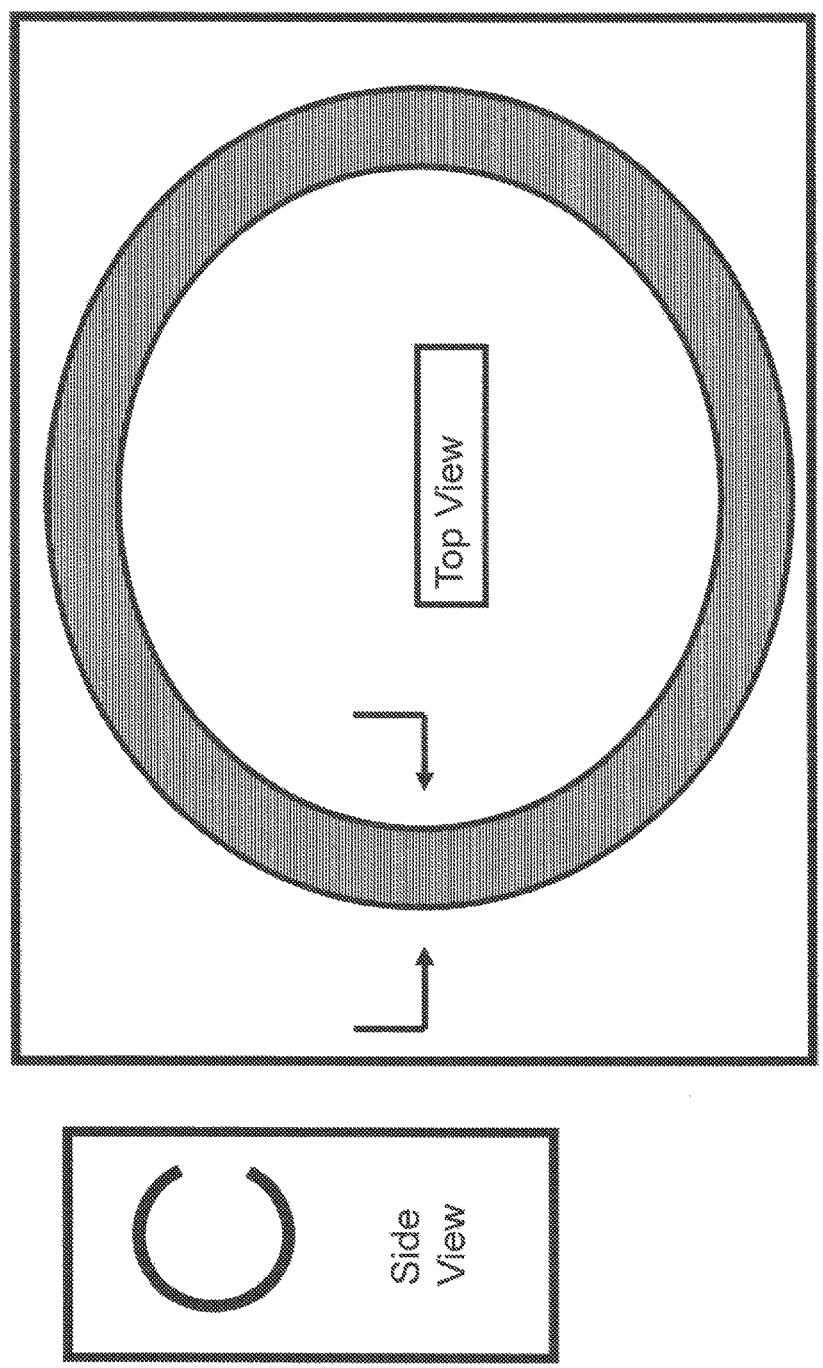
Fig. 3B Fixed Structure Top View and Side View

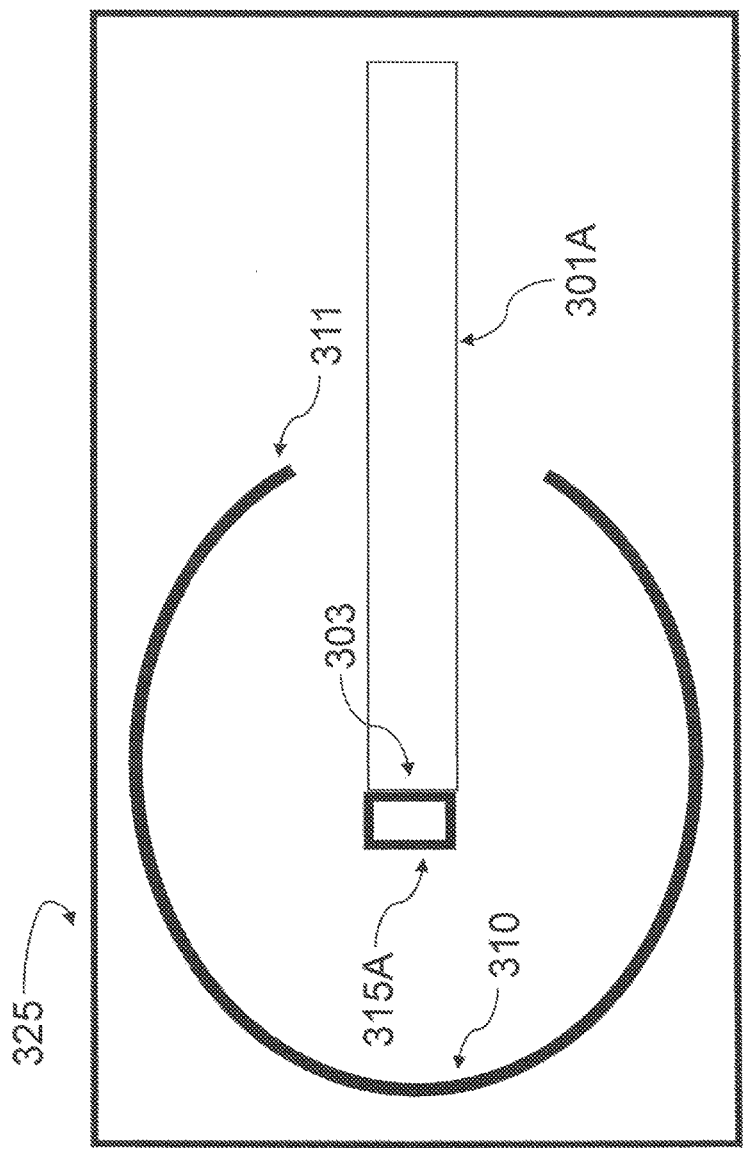
Fig. 3C Side View of Fixed Structure Inner Surface (310), Fin (315A), Spinning Tube (301A), Exit Port (303)

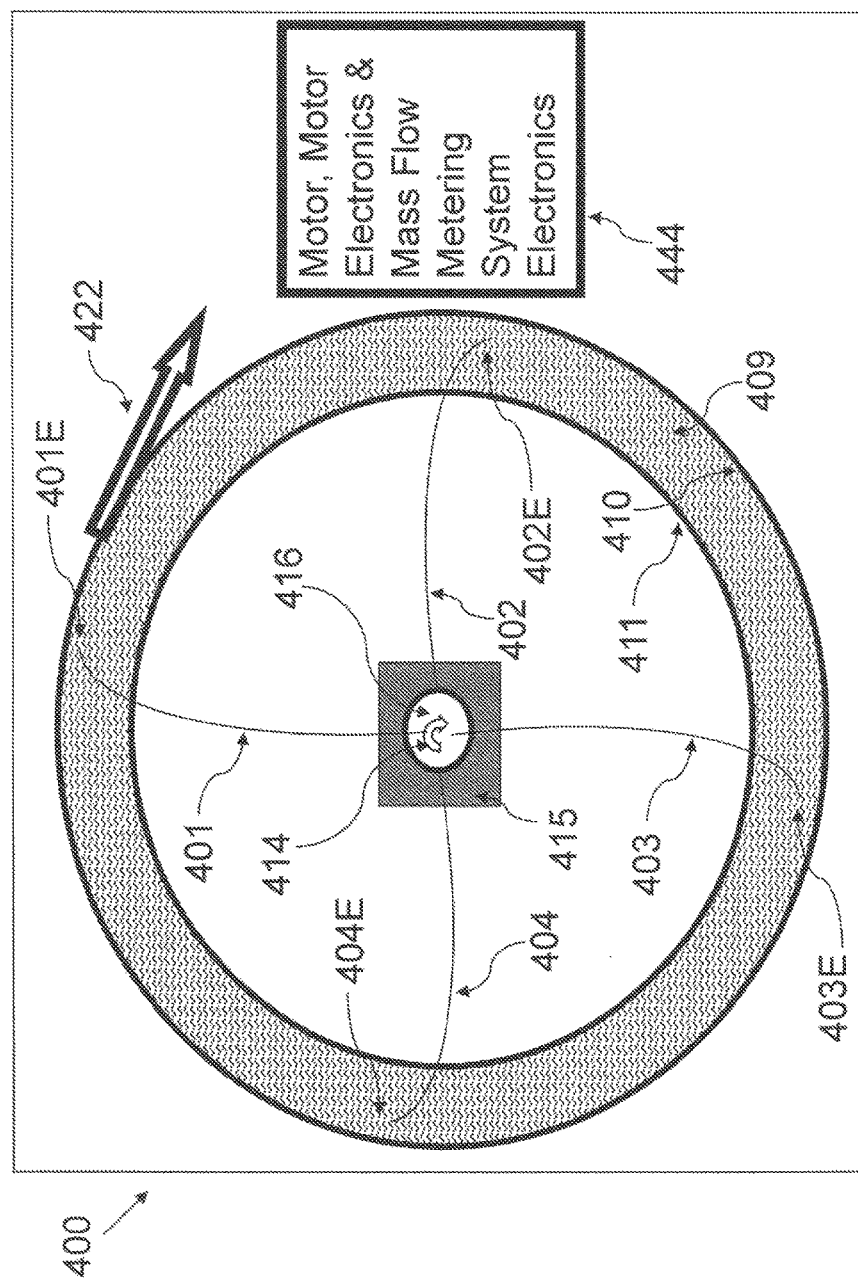
Fig. 4 Curved Spinning Tubes System

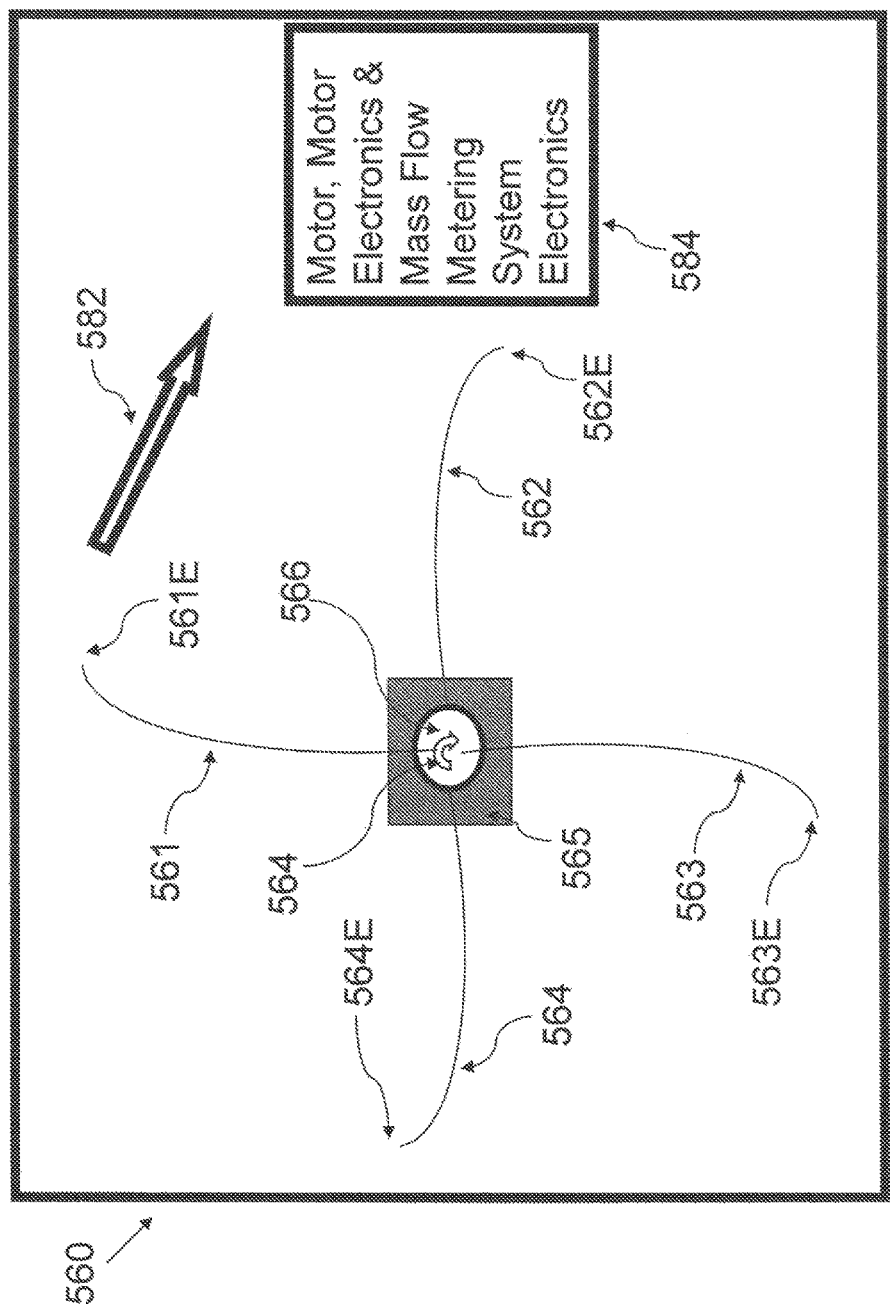
Fig. 5 Curved Spinning Tubes System – No Fixed Structure

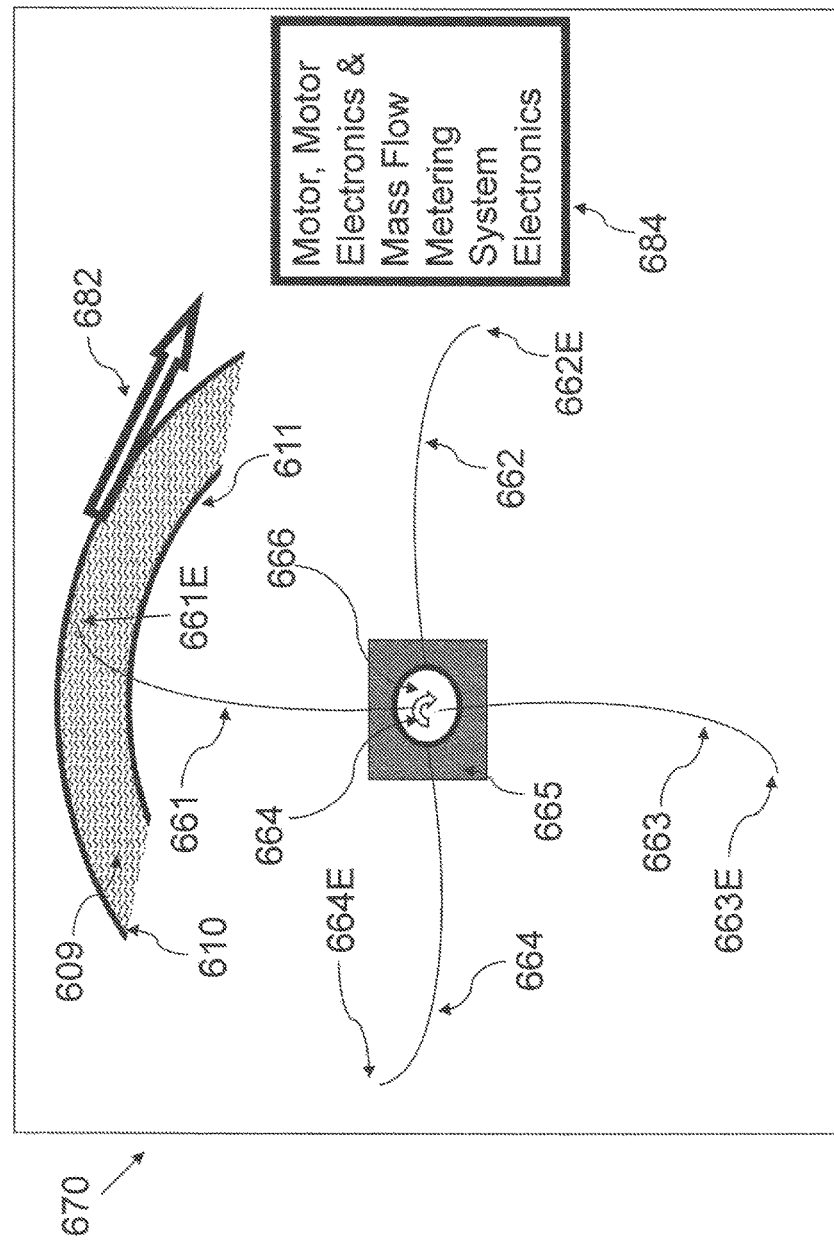
Fig. 6 Curved Spinning Tubes System – Partial Fixed Structure

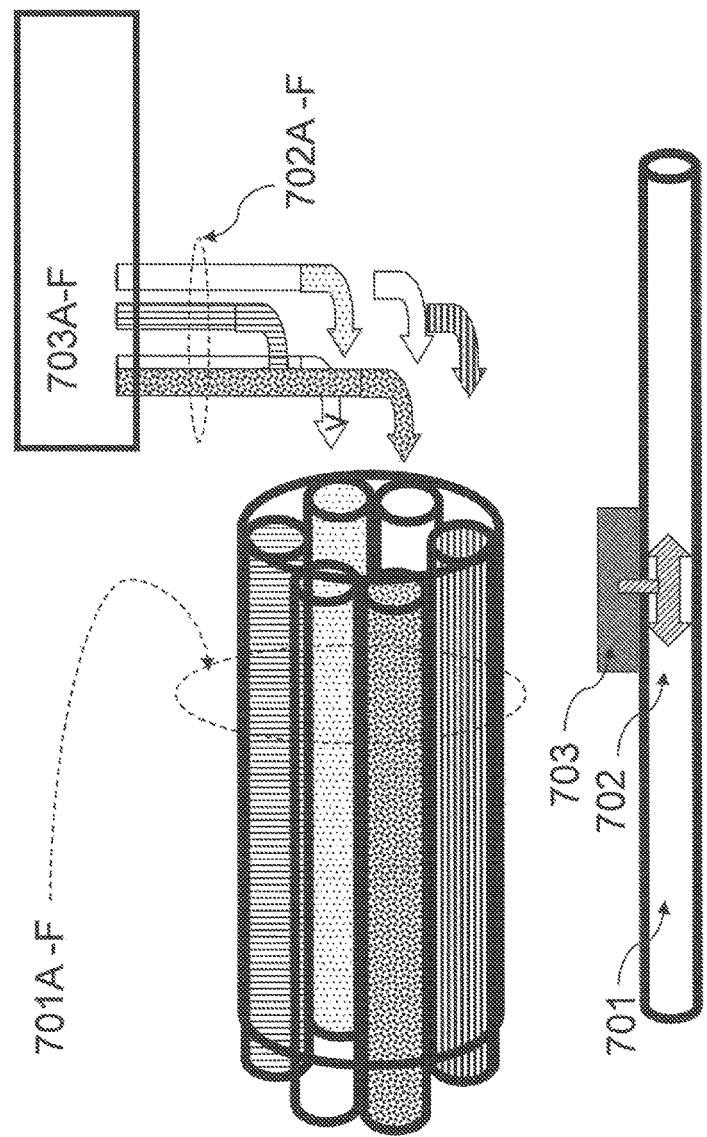
Fig. 7 Multiple Tubes inside Larger Spinning Tube

ACCELERATION AND PRECISION CONTROLLED EJECTION OF MASS

CROSS REFERENCE TO RELATED APPLICATIONS

This nonprovisional application claims the benefit of the U.S. provisional application Ser. No. 62/295,129 filed Feb. 14, 2016.

This invention relates to acceleration and precision controlled ejection of mass torn a rotational system.

BACKGROUND OF THE INVENTION

Machinery can accelerate a mass due to a centralized force. Some designs were developed in the Industrial Revolution. Physics textbooks teach these principles. Countless thousands of designs are used every day. Other accelerating motions can also induce velocity to a mass, including gyrating structures. Fluids under pressure can accelerate a mass, a conventional sand-blaster being an example. Fluids as a class are covered in this broad area of mass acceleration.

Rotation of a mass generates radial acceleration. If any part of the rotating mass is separated from the rest of the rotating mass then the central force Is no longer a radial accelerator to the separated mass. Once separated the mass follows a trajectory based upon whatever forces are still applicable, air resistance is a candidate for classic atmospheric projectiles. At the moment of separation from the radial force the separated mass' instantaneous velocity is tangent with respect to the radial force.

In introductory physics classes students are taught this concept using the 'string with a ball' wherein an undefined mechanism 'cuts' the string (a teaching construct). At the moment the ball is separated from the radial force an initial tangential motion for the ball is defined. Impact and atmospheric induced losses and gravity will dominate the changes in position, velocity, and acceleration of the ball until the ball comes to rest. The initial velocity of the ball attached at the end of the string most distant from the central force, axis of rotation, is simply the circumference of the pathway times the frequency of the rotation. For example if the string length is 3 feet (neglecting the dimensions of the ball) and is completing 10 rotations per second (10 Hz) then the instantaneous velocity is $3\pi$ time the frequency '10'. $(3)*(3.14)*(10)=94.2$ feet per second.

The string can be replaced with a hollow tube, and the mass can be any object that fits inside the hollow tube. The classic experiment is to have a latching mechanism holding the mass at some arbitrary location (initially at the most distant location from the axis of rotation) inside the hollow tube until the hollow tube, latch and mass are rotating at the desired frequency. Once at a stable frequency the latch releases the mass and the mass moves away on a trajectory defined as the tangent (instantaneous) from the axis of rotation. This experiment is nearly identical to the ball on a string experiment.

If the latched mass' position is moved inward toward the axis of rotation the mass will be released onto the inner surface of the hollow tube. Since the hollow tube is under a radial force there wilt be forces Imparted onto the mass.

Equations of motion, at the most simple level, can provide sufficient estimates of performance of a radial force's impact on a mass' exit velocity, given an arbitrary starting location inside the hollow tube. Along the inner surface of the hollow tube, where the mass is located, instantaneous velocity and radial acceleration vectors can be defined. If the hollow tube is considered to be made from an infinite number of thin rings then the velocity and acceleration of the tube's most distant 'thin ring' are greater than those 'thin rings' closer to the axis of rotation.

Sliding friction is nominally parts per thousand of the effective normal force on the mass inside the hollow tube. Rolling friction is typically smaller than sliding friction. Air resistance is also small as the local air mass Inside the rotating structure is accelerated in the same manner due to collisions between the inner surface of the hollow tube and the local air mass. Minor changes in the frequency are occurring as well. Causes of frequency changes include a variable mass distribution and drive power fluctuations.

As the mass is thrown from the rotating reference frame to a non-rotating frame there will foe an energy loss associated with the first physical contact. Depending upon the transition mechanics (physics sense) the mass can 'smoothly' traverse onto the non-rotating frame, or recoil upon first contact. Recoil would result in the mass changing trajectory from the nominal 'tangent' (at the moment of separation from the rotating system) to a new trajectory.

Cutting and abrasion can occur when one mass interacts with another mass. Both masses can be moving hut more traditional concepts are defined as one stationary mass being impacted by a second moving mass.

Methods exist for some of the applications Including using pneumatic, hydraulic, pneudralic, chemical, coiled (stored) energy, and gyrating methods of accelerating a mass which applies force on an object upon impact. For example, rotating machinery is used to throw shot-blast mass in a non-discriminating pattern or for cleaning castings in a foundry.

Sand-blasting uses a series of complicated relationships to perform abrasion. The stationary mass is secured, to prevent the abrasion mass torn causing the stationary mass from moving—conservation laws. Sand and air are mixed. Gas pressure causes the local air to move from the higher pressure zone to a lower pressure zone, generating a flow of air over a mass of small sand particles. These small sand particles become airborne and join the moving mass of air, thus creating a combined air/sand mixture. The moving air and sand are directed at the stationary mass, causing impacts (abrasion). If the mass of the non-air objects (stone instead of sand) are too large to be captured in the air flow then only air will impact the stationary mass.

Extremely high velocity water can cut harder surfaces such as metals. High pressure systems force water through a small exit opening.

Cutting tools can also use an accelerated mass. Chain saws are commonly used, wherein the metal cutting teeth are moved by a rotating shaft. Non-circular motion of the cutting teeth is defined by the pathway constraining the motion of the chain attached to the cutting teeth. Circular Saws, where the blade is directly attached to the rotating motor, also reflect state-of-the art.

Numerous chemical spray coating devices are sold ail over the world. Some devices offer combined chemicals as part of their delivery system. Nominally pressurized containers are used to move the sprayed chemicals. Once the pressurized gas is expended the application of the chemical is stopped. Pumps can supply pressurized systems with the necessary pressurized gas to keep the chemical delivery nearly continuous.

SUMMARY OF THE INVENTION

This invention relates to acceleration and precision controlled ejection of mass from a rotational system. The mass or masses can perform cleaning, cutting, etching, clearing demolition, abrading, debarring, media blasting, polishing, boring, drilling, aerating, emplacing, excavating, deploying, abrasion, mixing of chemicals, coating, and other surface and bulk volume effects. The invention also may provide simple momentum transfer.

Other objects and advantages of the present invention will become apparent to those skilled in the art upon a review of the following detailed description of the preferred embodiments and the accompanying drawings.

IN THE DRAWINGS

FIG. 1, Spinning Tube & Spinning Insertion Tube, shows a device, 100, where the Drive Shaft, 104, cause rotational motion of Spinning Tube, 101, and Spinning Insertion Tube, 102. Spinning Tube, 101, has an Exit Port, 103 wherein the mass exits the rotating structure and is 'captured' onto a stationary surface, the Fixed Structure, 110. Much of the details of the Fixed Structure, a cylinder shape structure in this figure, are omitted in this figure for clarity. Fixed Structure, 110, details are shown in FIGS. 1C and 1D. Mass is stored in the Hopper, 106, and flows into the Mass Flow Metering System, 105, before entry into the Spinning Insertion tube, 102. In this configuration, as shown in FIG. 1, the flow is only to one of the two ends of the Spinning Tube, 101, governed by the direction of the Spinning Insertion Tube, 102. Any mass in the Spinning insertion tube has a velocity, thus a defined direction of flow.

Drive Shaft 104, is shown as a shaft but there is a motor of some nature connected to this shaft. One configuration is a direct drive electric motor thus the actual drive shaft is just the interface component of the electric motor. Another configuration is a Power Take-Off device from a motor in a mobile vehicle such as a truck or tractor. Both of these are known in the industry and are omitted as obvious means to cause rotation. Other drive shaft power trains can be used. Motor, Motor Electronics & Mass Flow teetering System Electronics, 120, can be attached to or remote from the enclosure holding all the rest of the assembly. Uncompensated Angular Momentum can be controlled by either counter-spinning a mass, or by bolting the entire device to a massive object (concrete pad for example), or both.

Mass Flow Metering System, 105, can be purely mechanical without any electronics. In configurations using a pure mechanical design for metering mass into the Insertion Tube the Motor, Motor Electronics & Mass Flow Metering System Electronics, 120, is realty just a Motor and Motor Electronics.

Clockwise (CW) or Counter-Clockwise (CCW) rotations are acceptable directions for the Spinning Tube, 101, shown in FIG. 1. The direction of rotation can be limited by the shape of the Spinning Tube, 101. Tubes with curvature will have a preference for CW or CCW rotation.

In operations the Drive Shaft, 104, will ramp up in revolutions per minute (RPM), controlled by the Motor, Motor Electronics & Mass Flow Metering System Electronics, 120. After reaching the desired RPM the Motor & Mass Flow Metering System Electronics, 120, will engage the flow of mass (aka media gating) from the Mass Flow Metering System, 105, into the Spinning Insertion Tube, 102, and eventually into the Spinning Tube, 101. The media gating could be a rotating disk with either a hole or spiral chute. Like the motor the options for a gating device are known in the art. If the Mass Flow Metering System, 105, is purely mechanical and no electrical signals are used to actuate the How of mass then a gate opens once the necessary RPM is reached.

FIG. 1B, Spinning Tubes & Dual-ported Spinning Insertion Tube, shows a device, 150, very similar to device 100 in FIG. 1. Two changes differentiate device 150 from device 100; Device 150 has a dual-port Spinning Insertion Tube, 152, whereas device 100 has a single port-Spinning Insertion Tube, 102, and consequently device 150 has two exit ports, 151 and 157 one at each end of the Spinning Tube. 151. Gating of mass (media) into the dual port Spinning insertion tube, 152, will be twice as often in the configuration shown in FIG. 1. A single mass type dual port version of the Spinning Insertion Tube could be configured or two ports could be defined to allow for different masses, such as reactive chemicals to be accelerated independently and isolated until a reaction is desired.

Device 150 also has a Hopper, 166, a Drive Shaft, 154, a Fixed Structure, 160, a Mass Flow Metering System, 155, and Motor, Motor Electronics & Flow Metering System Electronics, 170. These functional elements are similar or identical to the equivalent to the same named elements of device 100.

FIG. 1C, Fixed Structure, Device 130, is a more detailed representation of object 110 in FIG. 1 and of object 160 in FIG. 1B. For these examples Fixed Structure, 130, is a cylinder. Only a portion of the Fixed Structure, 130, needs to have a curved surface. Fixed Structure, 130, serves as the guide for the mass and acts as a containment volume in case the moving structures have a mechanical failure. Two surfaces are identified, the inner surface of the cylinder, 162, and the outer surface, 161. On the inner surface, 162, there is an opening, Inner Surface Exit 163, connected to a Guide Tube, 164. Guide Tube, 164, extends beyond the enclosure.

In operations the Spinning Tube accelerates a mass, and the mass exits the Spinning Tube. This mass is delivered onto the Inner Surface, 162, With proper timing the mass is delivered onto Inner Surface. 162, such that the mass will only be briefly on the inner Surface, 162. The worst case timing scenario is the mass slides on the Inner Surface, 162, for slightly less than 360 degrees (the Inner Surface Exit is a few degrees in extent), before exiting the Inner Surface, 162, via the Inner Surface Exit, 163. The Inner Surface Exit, 163, is one end of the Guide Tube, 164. In FIG. 1C the Guide Tube, 164, is attached on the back side of the Fixed Structure, 130, dashed lines reflect the 'hidden view' effect.

FIG. 1D, Fixed Structure Inner Surface '162', is the inner Surface, 162, unrolled. The Inner Surface Exit, 163, is shown as an oval shape, reflecting the view from the inside of the cylinder. Guide Tube, 164, is dashed to reflect that it is behind the Inner Surface, 162. Two new features are the Guide Rails, 165 end 166. Guide Rails, 165 and 166, are angled but could be co-linear with the Guide Tube, 164. Guide Rails, 165 and 166, are separated from each other by a distance greater than the outer diameter of the Spinning Tube, 101, in FIG. 1, and are spaced on the Inner Surface, 162, to not interfere with the Spinning Tubes.

FIG. 2, Spinning Tube & Non-Spinning Insertion Tube (Side View), 200, shows another means of inserting mass into a Spinning Tube. Unlike devices 100 and 150 this device has a stationary Insertion Tube, 202. Insertion Tube, 202, is not connected to the rotating Drive Shaft, 204. The motor and control electronics previously shown in FIGS. 1 and 1B, Motor, Motor Electronics & Mass Flow Metering System Electronics, are omitted for clarity but these functions are necessary. Mass will exit the Stationary Tube, 202, enter Spinning Tube, 201, accelerate to the end of the Spinning Tube, 201, and exit at location 203.

Much of the details of the Fixed Structure are omitted in FIG. 2 for clarity, those fixed structure details are covered in FIG. 1C, Fixed Structure, and 1D, Fixed Structure Inner Surface '162'.

Mass is stored in the Hopper, 206, and flows into the Mass Flow Metering System, 205, before entry into the stationary Insertion Tube, 202. In this configuration the flow is only to one of the two ends of the Spinning Tube, 201, governed by the offset of Insertion Tube, 202, with respect to the axis of rotation defined by the shaft, 204. Mass Flow Metering System, 205, requires some mechanical means of movement to gate the mass (media) into the stationary Insertion Tube, 202, which can be supplied by the rotating shaft, 204, or another actuator (undefined in these figures).

In operations the Drive Shaft, 204, will ramp up in revolutions per minute (RPM), controlled by the Motor, Motor Electronics & Mass Flow Metering System Electronics, not shown. After reaching the desired RPM the Motor, Motor Electronics & Mass Flow Metering System Electronics will engage the flow of mass (aka media) from the Mass flow Metering System, 205, into the stationary Insertion Tube, 202, and eventually into the Spinning Tube, 201. The exact implementation of the gating could include a rotating disk with either a hole or spiral chute. Like the motor the gating devices are known in the art.

FIG. 2B, Two-views, Spinning Tube '201'—indexed, shows two views of a segment of Spinning Tube, 201. The portions of Spinning lube 201 are labeled as '201X'. Both views have an index with a letter 'A', 605 and 606, reflecting a 90 degree rotation between the two views. In the view with Index 'A', 605, the Opening, 607, where mass (media) falls into the Spinning Tube, 201, from Insertion Tube, 202, (as defined in FIG. 2) is clearly shown. After a rotation of 90 degrees, as seen in the lower drawing as defined by Index 'A', 606, as compared to upper drawing Index 'A', 605, the opening, 608, is less clear due to the viewing geometry.

FIG. 3, Spinning Tube with Feed & Storage (Top View), 300, is a top view of two opposing Spinning Tubes, 301A and 301B, with a center Drive Shaft, 304, a Hopper, 306, and Mass Flow Metering System, 305. At the Exit, 303, of Spinning Tube 301A there is an additional structure, a Fin, 315A. Fin, 315A, serves two purposes. Fin, 315A, generates a flow of local air (atmosphere) to facilitate the mass' transition to the FixedStructure Inner Surface, 310. Fin, 315A also acts as a shield in the event a mass fails to transition onto the FixedStructure Inner Surface, 310. An identical Fin, 315B, is located on Spinning Tube 301B. Spinning Tube 301B's Exit, 307, is adjacent to Fin 315B. FixedStructure Exit, 312, is shown with an arrow representing the local tangent at the FixedStructure Exit, 312. FixedStructure Exit, 312, extends beyond the enclosure. Fixed Structure, 309, is shaded, with perimeter edges defined, the innermost edge, 311, and the inside surface of outermost edge, 310. Mass transitions from the Spinning Tube Exits, 307 and 303, onto the FixedStructure's, 309, inner surface of the outermost edge, 310. FIGS. 3B and 3C will provide more details of Fixed Structure, 309.

FIG. 3B, FixedStructure Top View and Side View, are two views of the FixedStructure. Construction of the FixedStructure can be accomplished by taking a long hollow tube and bending it into a circle. After completing the circle shape a portion of the 'inside' wall is cut away, leaving a cross section shape like the letter 'C'. In FIG. 3 the surfaces 310 and 311 are edges of the volume of the FixedStructure.

FIG. 3C, Side View of FixedStructure Inner Surface (310), Fin (3165A), Spinning Tube (301A), Exit Port (303), Device 325, is an expanded side view of a portion of FIG. 3. In FIG. 3C the cross-section shape of the Fixed Structure looks like a letter 'C'. Spinning Tube, 301A, ends with an Exit Port, 303. The darker bolder structure, 315A, IS a Fin attached to the Spinning Tube, 301A. Fin, 315A, does not block, the Exit Port 303, as is shown in FIG. 3.

Device 400 is shown in FIG. 4, Curved Spinning Tubes System. Spinning Tubes 401, 402, 403, and 404 each have a labeled Exit, 401E, 402E, 403E and 404E respectively. Motor Shaft, 414, is reflecting a direction of rotation. Hopper, 416, is shown, as is the Mass Flow Metering System, 415. A large 'arrow', 422, notes the tangent of flight at the FixedStructure Exit, this extends beyond the enclosure. Motor, Motor Electronics, & Mass Flow Metering System Electronics, 444, are other features of this configuration. Fixed Structure, 409, is shown with two surfaces, the innermost edge, 411, and the inside surface of the outermost edge, 410.

Device 560 is shown in FIG. 5, Curved Spinning Tubes System—No Fixed Structure. Device 560, is almost Identical to Device 400, except there is no Fixed Structure in device 560. The FixedStructure, 409, in Device 400, is the element defined by its perimeters 410 and 411. All the features of Device 560 work exactly as Device 400 until the mass transition onto a Fixed Surface. Since there is no Fixed Structure in Device 560 the mass is in flight from the exits of the Spinning Tubes, 561E, 562E, 563E, and 564E until entry into the Guide Tube, 582, Guide Tube, 582, extends beyond the enclosure. This device is timing sensitive, any mass missing the entrance to the Guide Tube, 582, will impact the enclosure interior surface.

Device 670 is shown in FIG. 6, Curved Spinning Tubes System—Partial Fixed Structure. Device 670 is a hybrid between a 'circular' or '360 degree' Fixed Structure and no Fixed Structure. The distinguishing feature is the arc of Fixed Structure, 609, with its innermost edge, 611, and its' inside surface of its outermost edge, 610. Device 670 could be easier to build compared to any device with a fixed structure covering all 360 degrees of rotation. Device 670 operations would be sensitive to timing faults, but more forgiving than Device 560.

FIG. 7, Multiple Tubes inside Larger Spinning Tube, shows two versions of the rotating tube concepts. The lower portion of FIG. 7 is copied from FIG. 1B. Spinning Tube, 151, dual-port Spinning Insertion Tube, 152, and Mass Flow Metering System, 155. In FIG. 7 these are labeled as Spinning Tube, 701, dual-port Spinning insertion Tube, 702, and Mass Flow Metering System, 703. The upper portion of FIG. 7 shows six smaller tubes, 701A-F inside a larger tube, and six discrete Insertion tubes, 702A-F, inside a single insertion tube, six ports from the Mass Flow Metering System, 703A-F. 701A-F and 702 A-F and 703 A-F have mirror imaged components facing to the right (these are not shown for clarity).

DETAILED DESCRIPTION OF THE INVENTION

A hollow tube or other guide structure, with an interior diameter ranging from 1 inch to 16 inches, is rotated. A mass, smaller than the interior diameter of the tube or guide structure, is inserted into the hollow spinning tube or other guide structure resulting in the mass moving away from the axis of rotation; classic radial acceleration. An opening in the hollow tube or other guide structure close to the axis of rotation is selected as the mass insertion point. The opening shall be larger than the mass' dimensions. While inside the hollow tube or other guide structure the mass is subjected to classic radial acceleration, and fractional forces, along the length, of the hollow tube or other guide structure. Farthest from the axis of rotation, at the end of the hollow spinning tube or ether guide structure, is the mass' exit port. The mass exits the hollow spinning tube or other guide structure tangentially. A stationary structure, or fixed structure, is used to constrain the mass' trajectory and guide the mass to an impact via a guide tube. Guide Tube's interior diameter is larger than the dimensions of the mass. Stationary tubes will be larger than the spinning tube, ranging from 2 inches to 32 inches. Stationary structures, if not tubular, will have an accepting surface for the accelerated mass nominally larger the largest dimension of the accelerated mass, ranging from 2 inches to 32 inches, in the axis perpendicular to the vector defining the tangential flight of the mass after the mass departs the accelerating structure.

Guide tubes can extend and retract, have one or more stationary structure supplying mass, and one or more exit ports. Guide tubes can also have other sources of mass, flowing water or other chemical at low velocity or suction as examples, to assist in preparing surfaces before or after the impact from the accelerated mass.

Hollow tubing can be called 'closed' since the only openings are the ends. Various 'open' tube-like conduits can be used as mass guide structures.

Characteristics of the mass have not been introduced at this point, but a practical world is not a uniform density of a spherical mass object. A long list of mass objects are of interest, including sand, stones, water, and atmospheric gases. Empirical data are more useful in establishing a working product than just pure analytics.

There are additional terms to be considered for an analytical solution; characteristics of the mass, friction, gravity, air resistance, and shifts in frequency. All of these are being ignored as these designs will have sufficient power; simple frequency adjustment will be used to increase or decrease the exit velocity. Practical factors for commercialization are the mass flow rate, the velocity of the mass at impact, the cost of the device, and the cost to operate the device. Secondary factors are the power demand of the device, form factors, safety, and training. The mass of interest is substantially greater than the local atmosphere and the velocity will be maintained below Mach 1 where other complications become very important.

As the rotation frequency and/or mass increase the power must increase. Mass flow rates can be optimized for the available power by selecting the insertion location and frequency. Altering the pathway form, curves versus straight lengths, can help reduce the power load; a curved pathway is by mathematical definition longer than a straight line pathway. Since the exit velocity is defined by the radial tip velocity the curved pathway must take longer and as such use less power. Curvature of the spinning tube or guide structure just before the exit port can assist the transition to the non-moving stationary structure.

Additional structures, local fins, can be used to generate air currents at the exit port from the rotating tube or guide structure to fixed structures to steer the mass. These additional structures can also act as guides, funnels, and bumpers. Steering within a rotating tube, like rifling surfaces in a gun barrel, can also be used to generate angular momentum by causing the mass to rotate about its axis of flight.

Channels, additional structures, in the fixed structures allow the mass to enter and be guided to the impact point. Channels can be made with low friction coefficients to assist in maximizing the impact velocity of the mass at the target.

Complex chemistry at the target impact point can be accomplished by using multiple hollow tubes or other guide structures with different chemicals in isolated tubes or guide structures.

The physics and chemistry involved in these designs can be very simple, accelerate a stone and direct its trajectory to perform abrasion, or highly complex. A highly complex design could have many chemicals involved in a process where the timing of their interactions is critical, as are their states of matter. An intermediate degree of complexity might be fire suppression using chemicals that achieve the desired effects after they reach a specific temperature, and have an undesired consequence if mixed below some lower temperature (nominally found while in transport to the fire).

FIG. 1 (side view) shows a stationary supply hopper and rotating insertion tube, thus mass is accelerated inside the rotating insertion tube. A gating mechanism is included between the supply hopper and the rotating insertion tube to control the flow of mass into the rotating structures. Once inside the rotating Insertion tube the mass proceeds to the end of the insertion tube, exiting into a hollow spinning tube or other spinning guide structure. Rotation of the shaft, and assemblies attached to the shaft, can be direct drive from a motor, belt drive, or gear drive, or any equivalent.

A classic usage example is simple masses, water and sand, are metered by a rotating disk from the supply hopper Into an insertion tube or conduit. After acceleration occurs, in the rotating tube or conduit, the water and sand are transferred onto a stationary structure (fixed structure) and guided into a secondary tube to be directed at the target.

FIG. 2 has a stationary insertion tube, thus no radial acceleration occurs in this tube. Movement of the mass is provided by gravity or the feed control mechanism. To insert the mass into the rotating hollow tube or other guide structure a timed 'drop' (synchronous event) governed by gravity and other forces is required. These rotating hollow tube or other guide structure have openings on their surface facing the stationary insertion tube. By changing the mass' insertion position along the rotating hollow tube or other guide structure the exit velocity of the mass and duration in the accelerating structure can be controlled to maximize the mass flow rate.

Power is defined as the time rate of change of the momentum. Initial and final kinetic energies are defined by the entry and exit velocities of the mass. If two identical masses are inserted at two different positions along a fixed length tube, the insertion farther from the rotation axis will exit at a lower velocity and its power draw will be lower.

FIG. 2 defines a mechanism to optimize mass flow rate, at the expense of a lower exit velocity, by selection of the insertion position.

Both FIG. 1 and FIG. 2 can have mass insertions at either one or both ports for the two sides of the rotating hollow tube or guide structure; where the axis of rotation is the center point. Ideally the exits, from the rotating hollow tubes or guide structures will coincide with the location of the fixed structure's mass guide port leading to a target. Some masses will slide/roll along the inner surface of the containment structure until they enter the fixed structure's mass guide port; this is a waste of kinetic energy.

When complex chemical reactions are desired at the impact point(s), different pathways for each chemical can be defined. In FIGS. 1 and 2 there is a single Insertion tube (rotating and non-rotating versions) and a single rotating tube or multiple rotating tubes, and a single exit location onto the Fixed Structure. All of these singular constructs can be converted into multiple pathways.

Mass definition can be unique to each application. For low cost abrasion, sand and/or stone with or without water (a lubricant and mass) can be used.

A concrete truck's interior surfaces are layered with residual concrete after each load, building to a large mass over weeks or months. Using the available sand, stone and water at a typical Concrete Mixer Truck depot is a low cost approach. Achieving adequate mass flow fates and velocity is a design variable but is within the known art; a ballistic data base for cracking materials, including hardened concrete, is known. Tests data using a 140 centimeter radius rotating pipe at 16 hertz has proven to fee sufficient to accelerate and direct stones (under 2-3 centimeters in any dimension) and crack hardened concrete targets. Cost of the mass is zero dollars since the materials are usable in subsequent concrete mixes or as filler.

Smaller more specialized mass (media) such as ceramic balls have initial cost, and may be more acceptable to industries where the damage from random shaped stones Is not likely to be tolerated. If recovered these costs are limited to the initial cost and marginal replacements.

Fire suppression using chemicals is another example, delivery via pressurized systems except pressurized water is a hazard at a fire, but using a non-pressurized non-explosive accelerator to launch fire retardants into a blaze can be low cost as all the safety required of the competition is not required of this device. Launching complex chemicals mixed while in flight or upon contact would be advantageous. Elimination of the water might be necessary for the efficacy of the chemicals, and less water may be highly desirable where water is scarce and/or post-fire drainage is a pollution hazard.

Examples of utility of a non-chemical non-pressurized launch system span many industries and applications, including tunneling, drilling, demolition, concrete cleaning and shaping, hole boring, green sand and chemical mold and core removal, molten metal and ceramic refractory placement, avalanche control devices placement, and fire suppression machines.

We claim:

1. A system for accelerating mass comprising:
a power shaft;
a motor attached to the power shaft for rotating the power shaft;
one or more hollow tubes attached to the rotating power shaft and rotating with the power shaft;
one or more solid masses wherein the hollow tubes contain the solid masses;
wherein the rotating shaft has an axis of rotation;
wherein the hollow tubes have a length axis that is essentially perpendicular to the axis of rotation of the rotating shaft causing the hollow tubes to rotate in a plane defined by the axis of rotation of the power shaft;
wherein the rotating hollow tubes have an induced centrifugal acceleration that accelerates the masses inside the hollow tubes;
wherein the masses are injected into the hollow tubes at first low velocities, into at least one of the hollow tubes insertion openings with the first insertion opening on a spinning tube being the closest to the rotating power shaft and the last insertion opening being the farthest from the rotating power shaft;
wherein each tube has an exit opening, more distant from the power shaft than the insertion openings;
wherein the masses accelerate inside the hollow tube to a second higher velocity;
wherein the masses exiting the hollow tube exit opening at the higher velocity at all rotating positions of the rotating tube; and
wherein the masses exit the rotating tubes and transition onto a fixed structure.

2. A system according to claim 1 further comprising:
fins attached to the rotating tubes wherein the masses are guided onto the fixed structure by the fins.

3. A system according to claim 2 wherein the fins and the fixed structure are separated by distance equal to or greater than a maximum dimension, any axis, of the solid masses exiting the rotating tube.

4. A system according to claim 2 wherein the fixed structure has exit portals positioned on the fixed structure to direct a mass to a specific target.

5. A system according to claim 2 wherein the fins are curved with a radius of curvature selected from the following; less than the radius of curvature of the fixed structure by an amount sufficient to allow solid masses to fit between the fin and the fixed structure, less than the radius of curvature of the fixed structure by a fixed distance to limit the radial thickness of fluid masses to no more than the fixed distance.

6. A system according to claim 2 wherein the fins have an angular extent of less than 60 degrees, providing air current control and ricochet mitigation over that region.

7. A system according to claim 2 wherein the fins have a relative position with respect to the spinning tube exit opening, selected from the following; entire fin is leading the spinning tube exit opening, portion of the fin is leading, and portion of the fin is trailing the spinning tube exit port and does not block masses from exiting the spinning tube, entire fin is trailing the spinning tube exit opening.

8. A system according to claim 1 further comprising a system for cleaning, cutting, etching, clearing demolition, berating, deburring, media blasting, polishing, boring, drilling, aerating, emplacing, excavating, deploying, abrasion, chemical mixing, coating, and surface and bulk volume effecting.

9. A system according to claim 1 wherein the hollow tubes are rotating in multiple parallel planes defined by the axis of the rotating shaft.

10. A system according to claim 1 wherein the masses exiting the hollow tubes transition onto one or more fixed structures.

11. A system according to claim 1 wherein the insertion openings of hollow tubes can be at different radial distances from the axis of rotation for different tubes.

12. A system according to claim 1 wherein the masses' first low velocity can be provided by gravity, pressurized fluids, propeller and auger devices.

13. A system according to claim 1 wherein the mass flow is coincidental with the power shaft axis.

14. A system according to claim 1 wherein the hollow tubes are: linear, linear segment nearest the rotating shaft and curved segment farther from the rotating shaft and both segments are located in one plane, two linear segments in a plane having one dimension parallel to the spinning shaft, two linear segments in a plane having one dimension parallel to the spinning shaft and a transition arc at the intersection of the two linear segments, three segments where the first segment is linear and parallel to the spinning shaft and the second segment is linear and perpendicular to the spinning shaft and the third segment is curved and the second and third segments form a plane defined by the axis of the spinning shaft.

15. A system according to claim 1 wherein the mass is manmade with a solid exterior selected from the following shapes; spherical, cylindrical, cubic, conical, tetrahedral, and higher orders mathematically defined shapes, with similar axial dimensions ranging from nanometers to meters, made of any chemical composition to include pure elements, complexes of compounds, complex interior compositions to include; solids, fluids, suspensions.

16. A system according to claim 1 wherein the mass is shaped by nature selected from; microscopic particles in the nanometer class to macroscopic particles including sand, stone, pebbles, ore chunks.

17. A system according to claim 1 wherein the mass is a fluid.

18. A system according to claim 1 wherein the mass is a combination of solid and fluid.

19. A system according to claim 1 wherein the mass is inserted into the spinning tube continuously.

20. A system according to claim 1 wherein the mass is inserted into the spinning tube at a chopped frequency thereby aligning the arrival of the masses with the spinning tube insertion openings.

21. A system according to claim 20 wherein the chopped frequency is selected to optimize the mass flow rate into the spinning tube opening.

22. A system according to claim 1 wherein the spinning hollow tube has internal surface finishes selected from the following: smooth, fluted, channeled, grooved, rifled, and hardened.

23. A system according to claim 1 wherein the rotating power shaft is rotated at a frequency in the range of 1-10,000 hertz.

24. A system according to claim 1 wherein a horsepower rating of the motor rotating the shaft is rated between a fraction of one horsepower to several thousand horsepower.

25. A system according to claim 1 wherein an effective length of the spinning tube is greater than 0.1 millimeter and less than 10 meters.

26. A system according to claim 1 having means for monitoring shaft rotation indexing information is monitored.

27. A system according to claim 1 wherein additional mass objects are inserted into the hollow tubes, and said additional mass objects exit the hollow tubes.

28. A system according to claim 27 wherein a time interval between two adjacent mass objects being inserted into the hollow tube is synchronous with the shaft rotation.

29. A system according to claim 27 wherein additional mass objects are inserted into the hollow tube, and said additional mass objects exit said hollow tube and a duration of time the mass is inside the hollow tube is selected from the following; equal to the rotation period of the shaft, less than half and greater than one-third the shaft period, less than one-third and greater than one-fourth of the shaft period, less than one fourth and greater than one-fifth the shaft period.

30. A system according to claim 29 wherein the additional mass objects are inserted into hollow tube from a stationary tube connected to a container housing said additional mass objects, a mass flow device controls a relative temporal spacing between additional mass objects entering the stationary tube, and said stationary tube's proximal end is non-contacting with the hollow tube, and said hollow tube has an opening along its length axis to accept additional mass objects after said additional mass objects exit the proximal end of the stationary tube.

31. A system according to claim 30 wherein a location of the opening of the hollow tube is aligned with the axis of rotation of the shaft, and or offset from the axis of rotation of the shaft.

32. A system according to claim 1 wherein the mass is a state of matter of solids, liquids, gas or plasma.

33. A system according to claim 32 wherein the mass is; ice, sand, stones, metals, ceramics, plastic, composites made using one or more of the state of matter in the mass.

34. A system according to claim 32 wherein the liquid is an incompressible fluid that conforms to a shape of its container and retains a constant volume independent of pressure.

35. A system according to claim 32 wherein the mass has a density greater than 1 gram per cubic centimeter and is has rough edges.

36. A system according to claim 1 wherein the mass never exceeds Mach 1.

37. A system according to claim 1 wherein said stationary surface is selected from the following; inner surface of a wall of a right circular cylinder with a diameter slightly larger than a diameter swept by the rotating tube, conical section of a partial toroid with a diameter slightly larger than the diameter swept by the rotating tube, and curved plane with a radius of curvature slightly larger than the diameter swept by the rotating tube.

38. A system according to claim 37 wherein the stationary surface has contour on the inner surface to constrain the mass from deviating from a trajectory leading to the exit from the stationary surface to the second tube, said contour on stationary surface is free of dynamic interference with the swept volume of the rotating tubes.

* * * * *